Jan. 14, 1969 J. A. VALLEE 3,422,425

CONVERSION FROM NRZ CODE TO SELF-CLOCKING CODE

Filed June 29, 1965 Sheet 1 of 3

INVENTOR.
JOHN A. VALLEE
BY
Carl V. Olson
Attorney

INVENTOR.
JOHN A. VALLEE
BY
Carl V. Olson
Attorney

INVENTOR.
JOHN A. VALLEE
BY
Carl V. Olson
Attorney

United States Patent Office 3,422,425
Patented Jan. 14, 1969

3,422,425

CONVERSION FROM NRZ CODE TO SELF-CLOCKING CODE

John A. Vallee, Juno Beach, Fla., assignor to Radio Corporation of America, a corporation of Delaware Filed June 29, 1965, Ser. No. 467,931
U.S. Cl. 340—347 5 Claims
Int. Cl. H04l 3/00; H03k 1/00; H03k 13/00

This invention relates to digital information code converters, and has for its object the provision of an improved converter which translates a simple non-return-to-zero (NRZ) information input signal, having an accompanying timing wave, to a self-clocking information signal in which there is a transition to represent a "1" and a transition at the boundary between two successive "0's." While not limited thereto, the invention is particularly useful in magnetic recording and reproducing systems for converting a simple NRZ signal derived from a shift register to a self-clocking signal adapted to be recorded on a magnetic medium with a relatively high information packing density.

In accordance with an example of the invention, there is provided an inverter to translate the simple non-return-to zero input signal to an inverted input signal. A first gate means enabled by a first timing pulse wave couples the input signal and the inverted input signal to set and reset inputs of a first flip-flop to produce a delayed input signal. A second gate means enabled by a second timing pulse wave couples outputs of the first flip-flop to set and reset inputs of a second flip-flop to produce an additionally delayed input signal. An output of the second gate means also is coupled to the trigger input of a triggerable flip-flop to cause an output transition for every "1" in the input signal. A third gate means is enabled by the first timing pulse wave, the inverted input signal and an output of the second flip-flop. The output of the third gate means is coupled to the trigger input of the triggerable flip-flop to cause a transition for every occurrence of two successive "0's" in the input signal. The output of the triggerable flip-flop is a self-clocking information signal in which there is a transition to represent a "1" and a transition at the boundary between two successive "0's."

Figure 1:
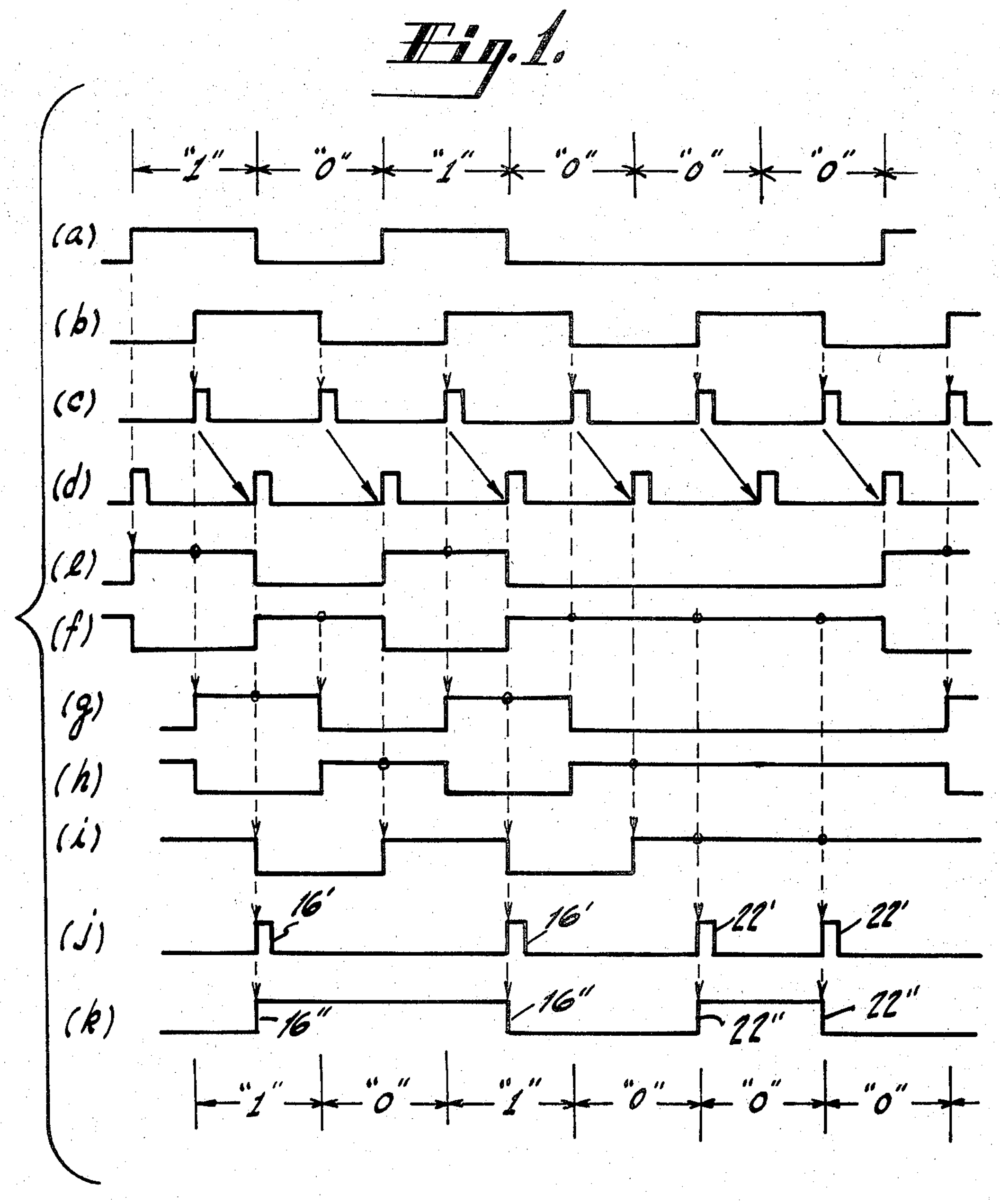
FIG. 1 is a chart of voltage waveforms, somewhat idealized, showing an input information signal in the NRZ code, intermediate voltage waveforms, and an output information signal in a self-clocking code.

Referring now in greater detail to the drawing, FIG. 1*a* shows the waveform of a simple non-return-to-zero (NRZ) signal conveying the illustrative binary information 101000. FIG.1*b* shows the waveform of a timing signal accompanying the information signal for use in deriving the information bits from the information signal at regularly spaced intervals. The signals of FIGS. 1*a* and 1*b* are signals of a type customarily supplied by an electronic digital system including a shift register. The information signal of FIG. 1*a* is an input signal supplied to the input terminal 10 of the converter of FIG. 2, and the timing wave of FIG. 1*b* is supplied to the timing input terminal 12 of the converter.

Figure 2:
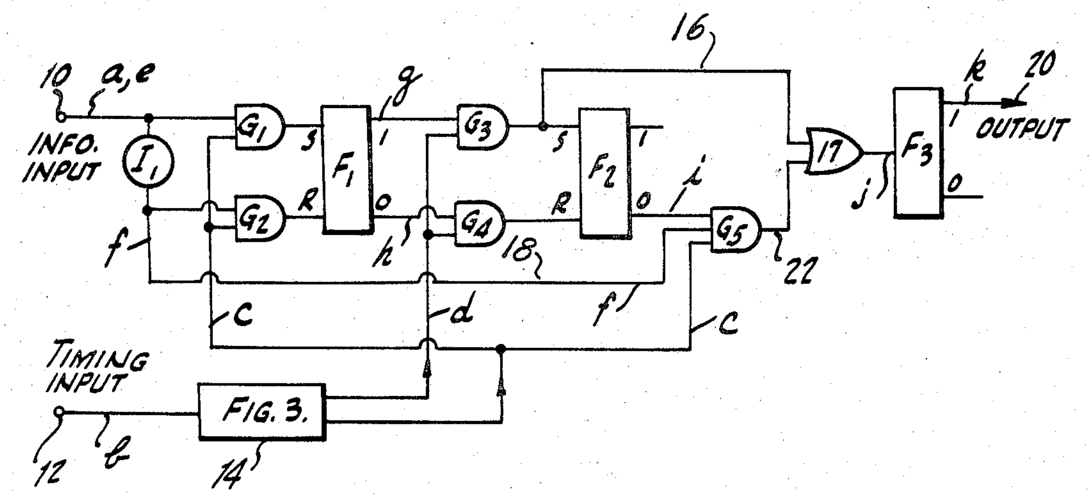
FIG. 2 is a diagram of a code converter constructed according to the teachings of the invention to provide the code conversion illustrated by waveforms in FIG. 1.

The converter of FIG. 2 includes an inverter $I_1$ connected to the input terminal 10 to translate the input information signal to an inverted information signal. The input signal from terminal 10 is coupled through a gate $G_1$ to the set input of a first flip-flop $F_1$. The gate $G_1$, and all the other gates shown, are conventional "and" gates. Other types of gates may, of course, be employed provided that appropriate attention is given to the polarities of the signals involved and the basic functions performed by the gates. The output of the inverter $I_1$ is coupled through gate $G_2$ to the reset input of flip-flop $F_1$. The gates $G_1$ and $G_2$ are enabled by an output *c* from a timing circuit 14.

The "1"output from flip-flop $F_1$ is coupled through a gate $G_3$ to the set input of a second flip-flop $F_2$. The "0" output of flip-flop $F_1$ is coupled through a gate $G_4$ to the reset input of the second flip-flop $F_2$. The gates $G_3$ and $G_4$ are enabled by a timing pulse wave *d* from the timing circuit 14.

The output of the gate $G_3$ is also connected, over line 16, to the trigger input of a triggerable flip-flop $F_3$. The "0" output of the second flip-flop $F_2$ is coupled through a gate $G_5$ to the trigger input of triggerable flip-flop $F_3$. The gate $G_5$ also receives an inverted input signal over line 18 from the inverter $I_1$, and receives the timing pulse wave *c* from the timing circuit 14. An output line 20 from the "1" output of triggerable flip-flop $F_3$ provides a self-clocking output information signal as shown by the waveform of FIG. 1*k*. The output information signal is one in which there is a transition to represent a "1" and a transition at the boundary between two successive "0's."

Figure 3:
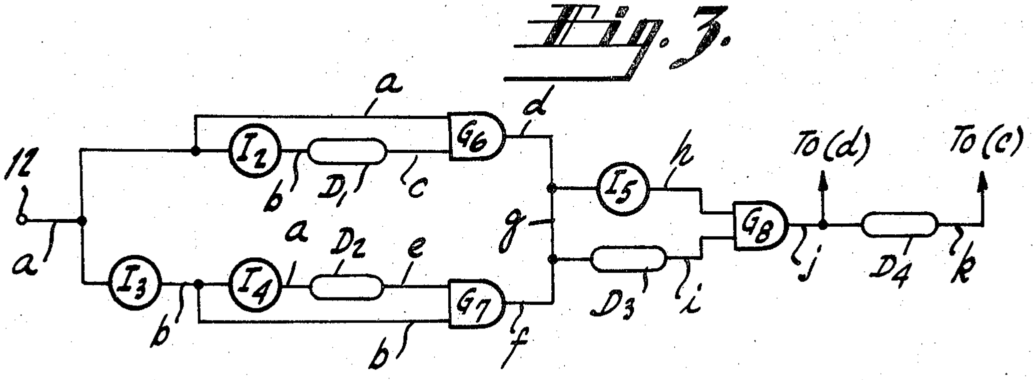
FIG. 3 is a detailed diagram of a timing wave circuit useful in the system of FIG. 2.

Reference will now be made to FIGS. 1 and 2 for a description of the operation of the code converter shown. An example of a timing circuit suitable for use in the box 14 of FIG. 2 is shown in FIG. 3 and will be described later. The timing circuit 14 of FIG. 2 supplies a first timing pulse wave *c* as shown in FIG. 1*c*, and a second timing pulse wave *d* as shown in FIG. 1*d*. The pulses of the first timing pulse wave of FIG. 1*c* occur at the centers of the information bit cells of the input information signal of FIG. 1*a*. The pulses of the second timing pulse wave of FIG. 1*d* occur at the boundaries of the information bit cells of the input information signal of FIG. 1*a*.

Gates $G_1$ and $G_2$ are enabled by the pulses of the first timing pulse wave *c* to pass the input information signal (FIGS. 1*a* and 1*e*) and the inverted input information signal (FIG. 1*f*) to the set and reset inputs, respectively, of the first flip-flop $F_1$. The input thus applied to the first flip-flop $F_1$ causes it to produce the delayed input information signal shown in FIG. 1*g*, and the delayed and inverted information signal shown in FIG. 1*h*. The delayed information signals from flip-flop $F_1$ are delayed an amount equal to one-half the period of a bit cell of the input information signal.

The delayed information signal outputs from the first flip-flop $F_1$ are coupled through respective gates $G_3$ and $G_4$ to the respective set and reset inputs of the second flip-flop $F_2$. The gates $G_3$ and $G_4$ are enabled at the times of the pulses of the timing wave *d* of FIG. 1*d*, so that the outputs of the second flip-flop $F_2$ provide an additionally delayed input information signal. The additionally delayed information signal at the outputs of the second flip-flop $F_2$ are delayed an amount equal to the period of one bit cell of the input information signal. Use is made of only the inverted and additionally delayed signal (FIG. 1*i*) from the "0" output of the second flip-flop $F_2$.

The output of gate $G_3$ is also connected over line 16 and through an "or" gate 17 to the trigger input T of the triggerable flip-flop $F_3$. Gate $G_3$ is enabled by its inputs to supply over line 16 the trigger pulses 16' shown in FIG. 1*j*. The trigger pulses 16' each cause a reversal of the state of the triggerable flip-flop $F_3$ so that the output at 20 is a signal as shown in FIG. 1*k* having transitions at 16″.

The transitions 16″ in the output wave of FIG. 1*k* are transitions representing "1" information bits corresponding with the "1" information bits of the input information signal of FIG. 1*a*. The "1"-indicating transitions 16″ occur at the centers of the bit cells of the output wave shown in FIG. 1*k*. The output signal information is in a code in which a transition at the center of a bit cell represents a "1," and the absence of a transition at the center of a bit cell represents a "0."

The output of gate $G_5$ is also connected through "or" gate 17 to the trigger input T of the triggerable flip-flop $F_3$. Gate $G_5$ provides an output trigger pulse on line 22 only when enabled by a timing pulse *c* (FIG. 1*c*) and when simultaneously enabled by an inverted input information signal (FIG. 1*f*) over line 18 and an additionally delayed and inverted information signal (FIG. 1*i*) from the second flip-flop $F_2$. The resulting trigger pulses 22′ of FIG. 1*j* cause transitions 22″ in the output signal, shown in FIG. 1*k*, from the triggerable flip-flop $F_3$.

The trigger pulses 22′ and the output transitions 22″ each occur solely at the boundary between two successive "0" information bits in the output wave of FIG. 1*k*. The centers of the output bit cells represent "0's" and have no transitions, in accordance with the previously stated coding rules. The frequency of occurrence of transitions depends on the information carried by the signal. The output information signal of FIG. 1*k* is a signal wherein transitions occur with a spacing of two bit cells when the information consists of alternating "1's" and "0's." The transitions occur with a spacing of one bit cell when the information consists of all "1's" or all "0's." And, the transitions occur with a spacing of one and one-half bit cell periods when the information follows the pattern 100100100.

The output information signal of FIG. 1*k* is especially well adapted for recording on a magnetic medium to provide a high packing density of information on the magnetic medium. The signal is one having relatively few transitions considering the quantity of information involved. There is never more than one transition per information bit cell. Furthermore, the signal is one from which a timing wave can be extracted for use in strobing the information carried by the signal. A transition occurs at least once during every two bit cells. A timing wave can be extracted from the signal read off from the magnetic medium by providing a "preamble" to each recorded message, the preamble preferably consisting several successive "0's" (or "1's"). With such a standardized preamble, proper phase of the extracted timing wave can be insured.

Reference is now made to FIG. 3 for an example of a timing circuit useful as the timing circuit 14 in FIG. 2. The input terminal 12 in FIG. 3 receives an input timing wave shown in FIG. 4*a*. Inverter $I_2$ produces an inverted input timing wave shown in FIG. 4*b*. A delay unit $D_1$ produces an inverted and delayed timing wave as shown in FIG. 4*c*. A gate $G_6$ receives the input timing wave of FIG. 4*a* and the inverted and delayed input timing wave of FIG. 4*c* and produces at its output a wave as shown in FIG. 4*d*.

Inverter $I_3$ inverts the input signal of the input timing wave of FIG. 4*a* to produce the inverted wave of FIG. 4*b*. An inverter $I_4$ reinverts the input timing wave, and a delay unit $D_2$ produces a delayed timing wave as shown in FIG. 4*e*. The waves of FIGS. 4*e* and 4*b* are applied to a gate $G_7$ to provide a output wave as shown in FIG. 4*f*. The waves of FIGS. 4*d* and 4*f* are combined to result in the wave shown in FIG. 4*g*. The wave of FIG. 4*g* can be made a perfectly symmetrical square wave by adjusting the delay units $D_1$ and $D_2$.

Figure 4:
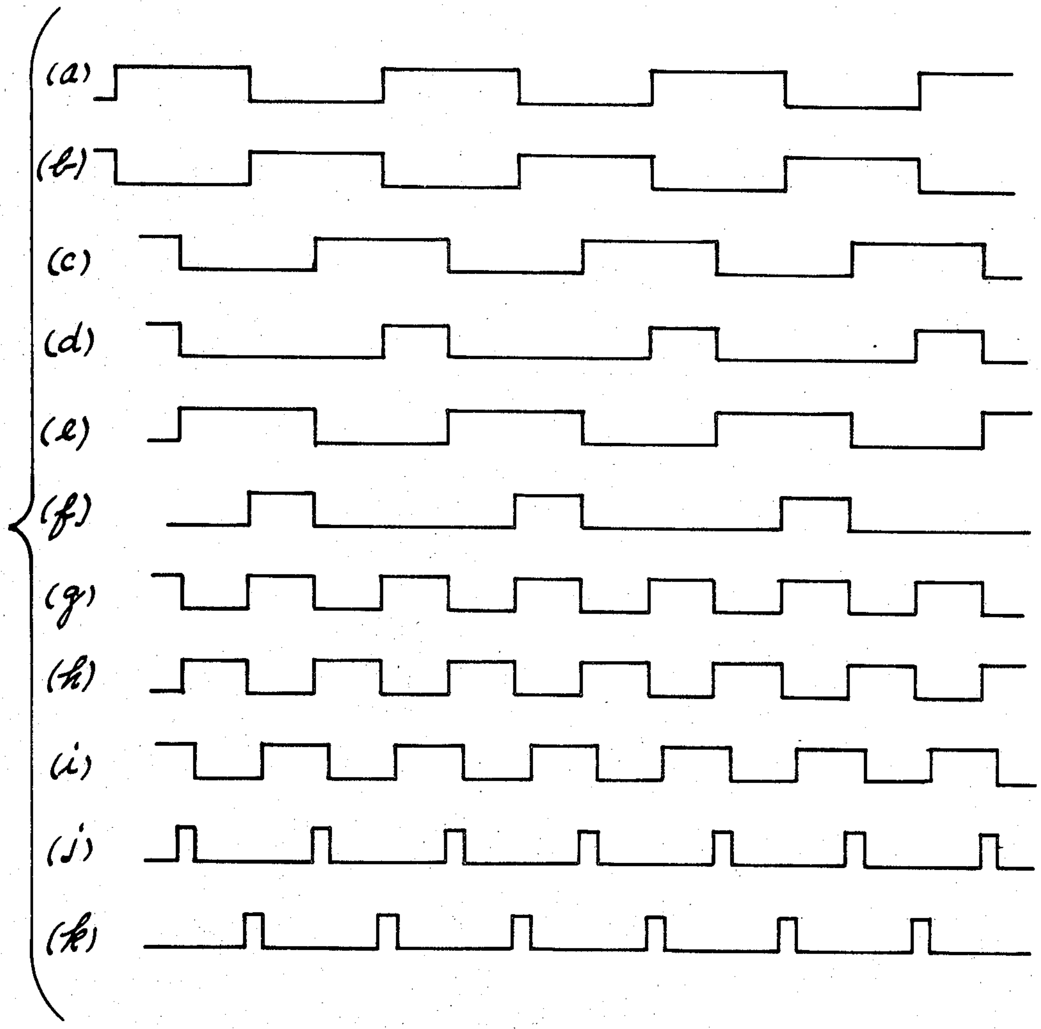
FIG. 4 is a chart of voltage waveforms, somewhat idealized, which will be referred to in describing the operation of the timing circuit of FIG. 3.

The wave of FIG. 4*g* is inverted by an inverter $I_5$ to produce a wave shown in FIG. 4*h*, and is delayed in a delay unit $D_3$ to produce a wave as shown in FIG. 4*i*. These two waves applied to a gate $G_8$ result in a wave shown in FIG. 4*j*, which is suitable for use as the wave *d* in the system of FIG. 4. The wave of FIG. 4*j* is delayed in a delay unit $D_4$ to provide the delayed wave of FIG. 4*k*, which is suitable for use as the wave *c* in the system of FIG. 2.

What is claimed is:

1. A code converter utilizing a non-return-to-zero information input signal, an accompanying first timing pulse wave of pulses occurring within bit cells of the input signal and a second timing pulse wave of pulses occurring at the boundaries of bit cells of the input signal, comprising means enabled by said first timing pulse wave to translate said input signal to a delayed input signal,
a triggerable flip-flop,
means enabled by said second timing pulse wave and said delayed input signal to apply a trigger pulse to said triggerable flip-flop,
means enabled by said second timing pulse wave to translate said delayed input signal to an additionally delayed input signal, and
means enabled by said first timing pulse wave, said input signal and said additionally delayed input signal to apply a trigger pulse to said triggerable flip-flop,
whereby the output of said triggerable flip-flop is a self-clocking information signal in which there is a transition to represent a "1" and a transition at the boundary between two successive "0's."

2. A code converter utilizing a non-return-to-zero information input signal, an accompanying first timing pulse wave of pulses occurring within bit cells of the input signal and a second timing pulse wave of pulses occurring at the boundaries of bit cells of the input signal, comprising first means enabled by said first timing pulse wave to translate said input signal to a delayed input signal,
a triggerable flip-flop,
second means enabled by said second timing pulse wave to translate said delayed input signal to an additionally delayed input signal, and to supply a trigger pulse to said triggerable flip-flop, and
third means enabled by said first timing pulse wave, said input signal and said second means to couple a trigger pulse to said triggerable flip-flop,
whereby the output of said triggerable flip-flop is a self-clocking information signal in which there is a transition to represent a "1" and a transition at the boundary between two successive "0's."

3. A code converter utilizing a non-return-to-zero information input signal, an accompanying first timing pulse wave of pulses occurring within bit cells of the input signal and a second timing pulse wave of pulses occurring at the boundaries of bit cells of the input signal, comprising first and second flip-flops,
first gate means enabled by said first timing pulse wave to couple said input signal to said first flip-flop to produce a delayed input signal,
second gate means enabled by said second timing pulse wave to couple outputs of said first flip-flop to said second flip-flop to produce an additionally delayed input signal,
a triggerable flip-flop,
means to couple an output of said second gate means to the said triggerable flip-flop, and
third gate means enabled by said first timing pulse wave, said input signal and said additionally delayed input signal to couple a pulse to said triggerable flip-flop,
whereby the output of said triggerable flip-flop is a self-clocking information signal in which there is a transition to represent a "1" and a transition at the boundary between two successive "0's."

4. A code converter utilizing a non-return-to-zero information input signal, an accompanying first timing pulse wave of pulses occurring within bit cells of the input signal and a second timing pulse wave of pulses occurring at the boundaries of bit cells of the input signal, comprising an inverter to translate said input signal to an inverted input signal, first and second flip-flops, first gate means enabled by said first timing pulse wave to couple said input signal and said inverted input signal to said first flip-flop, second gate means enabled by said second timing pulse wave to couple outputs of said first flip-flop to said second flip-flop, a triggerable flip-flop, means to couple an output of said second gate means to said triggerable flip-flop, and third gate means enabled by said first timing pulse wave, said inverted input signal and an output of said second flip-flop to couple a pulse to said triggerable flip-flop, whereby the output of said triggerable flip-flop is a self-clocking information signal in which there is a transition to represent a "1" and a transition at the boundary between two successive "0's."

5. A code converter utilizing a non-return-to-zero information input signal, an accompanying first timing pulse wave of pulses occurring within bit cells of the input signal and a second timing pulse wave of pulses occurring at the boundaries of bit cells of the input signal, comprising an inverter to translate said input signal to an inverted input signal, first and second flip-flops, first gate means enabled by said first timing pulse wave to couple said input signal and said inverted input signal to set and reset inputs of said first flip-flop to produce a delayed input signal, second gate means enabled by said second timing pulse wave to couple outputs of said first flip-flop to set and reset inputs of said second flip-flop to produce an additionally delayed input signal, a triggerable flip-flop, means to couple an output of said second gate means to the trigger input of said triggerable flip-flop, and third gate means enabled by said first timing pulse wave, said inverted input signal and an output of said second flip-flop to couple a pulse to the trigger input of said triggerable flip-flop, whereby the output of said triggerable flip-flop is a self-clocking information signal in which there is a transition to represent a "1" and a transition at the boundary between two successive "0's."

References Cited

UNITED STATES PATENTS

| | | | |
|---|---|---|---|
| 3,047,853 | 7/1962 | Machol | 340—347 |
| 3,263,185 | 7/1966 | Lender | 328—118 X |
| 3,264,623 | 8/1966 | Gabor | 340—174.1 |

MAYNARD R. WILBUR, *Primary Examiner.*

M. K. WOLENSKY, *Assistant Examiner.*

U.S. Cl. X.R.

328—63, 55